US012495241B2

(12) United States Patent
Robertson

(10) Patent No.: US 12,495,241 B2
(45) Date of Patent: Dec. 9, 2025

(54) APPARATUS AND METHOD FOR TREATING MISOPHONIA

(71) Applicant: The Board of Regents of the University of Oklahoma, Norman, OK (US)

(72) Inventor: Elijah Robertson, Oklahoma City, OK (US)

(73) Assignee: The Board of Regents of the University of Oklahoma, Norman, OK (US)

( * ) Notice: Subject to any disclaimer, the term of this patent is extended or adjusted under 35 U.S.C. 154(b) by 230 days.

(21) Appl. No.: 18/204,496

(22) Filed: Jun. 1, 2023

(65) Prior Publication Data

US 2023/0396917 A1 Dec. 7, 2023

Related U.S. Application Data

(60) Provisional application No. 63/347,878, filed on Jun. 1, 2022.

(51) Int. Cl.

| | |
|---|---|
| ***A61F 11/06*** | (2006.01) |
| ***G10K 11/16*** | (2006.01) |
| ***H03B 29/00*** | (2006.01) |
| ***H04R 1/10*** | (2006.01) |

(52) U.S. Cl.
CPC .................................. *H04R 1/1083* (2013.01)

(58) Field of Classification Search
CPC .................................................... H04R 1/1083
See application file for complete search history.

(56) References Cited

U.S. PATENT DOCUMENTS

| | | | | |
|---|---|---|---|---|
| 2016/0270718 | A1* | 9/2016 | Heneghan | G16H 50/30 |
| 2022/0415301 | A1* | 12/2022 | Birmingham | G10K 11/17823 |
| 2023/0300532 | A1* | 9/2023 | Spittle | G06F 3/165 381/1 |

OTHER PUBLICATIONS

A. Schroder et al., "Diminished n1 auditory evoked potentials to oddball stimuli in misophonia patients," Front Behav Neurosci, vol. 8, p. 123, 2014.

(Continued)

*Primary Examiner* — Simon King
(74) *Attorney, Agent, or Firm* — Crowe & Dunlevy, P.C.

(57) ABSTRACT

Systems and methods for treating misophonia include utilizing machine learning within a deep learning processor to allow a user to listen to ambient sounds from their environment without hearing trigger sounds. The method includes the steps of recording ambient sounds with one or more microphones, digitizing the recorded ambient sounds into digital signals, creating spectrographic data for the digital signals, comparing the spectrographic data against a signature library that comprises preprogrammed spectrographic data for the unwanted trigger sounds, identifying the spectrographic data that corresponds to the unwanted trigger sounds, removing the unwanted trigger sounds from the spectrographic data to provide filtered spectrographic data, converting the filtered spectrographic data into a filtered digital signal, converting the filtered digital signal into a filtered audio signal that does not include the unwanted trigger sounds, and playing the filtered audio signal to the user through the one or more speakers on the headset.

12 Claims, 5 Drawing Sheets

(56) References Cited

OTHER PUBLICATIONS

G. Yu, Y. Guan, W. Meng, C. Zheng, and H. Wang, "DMF-Net: A decoupling-style multi-band fusion model for real-time full-band speech enhancement," arXiv preprint arXiv:2203.00472, 2022.
G. Zhang, L. Yu, C. Wang, and J. Wei, "Multi-Scale Temporal Frequency Convolutional Network With Axial . . . ," in ICASSP 2022—2022 IEEE International Conference on Acoustics, Speech and Signal Processing (ICASSP), May 23-27, 2022 2022, pp. 9122-9126.
H. Dubey et al., "Icassp 2022 deep noise suppression challenge," in ICASSP 2022-2022 IEEE International Conference on Acoustics, Speech and Signal Processing (ICASSP), 2022: IEEE, pp. 9271-9275.
I. Potgieter, C. MacDonald, L. Partridge, R. Cima, J. Sheldrake, and D. J. Hoare, "Misophonia: A scoping review of research," J Clin Psychol, vol. 75, No. 7, pp. 1203-1218, Jul. 2019.
L. Chen et al., "Multi-Stage and Multi-Loss Training for Full band Non-Personalized and Personalized Speech Enhancement," in ICASSP 2022—2022 IEEE International Conference on Acoustics, Speech and Signal Processing (ICASSP), May 23-27, 2022, pp. 9296-9300.
S. Zhao, B. Ma, K. N. Watcharasupat, and W. S. Gan, "FRCRN: Boosting Feature Representation Using Frequency Recurr . . . ," in ICASSP 2022—2022 IEEE International Conference on Acoustics, Speech and Signal Processing (ICASSP), May 23-27, 2022, pp. 9281-9285.
X. Hao, X. Su, R. Horaud, and X. Li, "FullSubNet: a full-band and sub-band fusion model for real-time single-channel . . . ," in ICASSP 2021-2021 IEEE International Conference on Acoustics, Speech and Signal Processing (ICASSP), 2021: IEEE, pp. 6633-6637.

* cited by examiner

APPARATUS AND METHOD FOR TREATING MISOPHONIA

CROSS REFERENCE TO RELATED APPLICATIONS

The present application claims the priority benefit of U.S. provisional application No. 63/347,878, filed Jun. 1, 2022, the contents of which are hereby incorporated herein by reference in its entirety.

BACKGROUND

Misophonia is a condition characterized by increased sensitivity of an individual to certain sounds, commonly referred to as "trigger sounds." The misophonic response can be varied, but it is often represented by an autonomic stress response accompanied by an emotional reaction, extreme cases of which may lead to physical aggression. Those with the condition tend to live in a constant state of anxiety in public as they cannot predict when the next trigger will occur. An unfortunate consequence is the tendency of the sufferer to avoid social situations in which trigger sounds are likely to be present. See I. Potgieter, C. MacDonald, L. Partridge, R. Cima, J. Sheldrake, and D. J. Hoare, "*Misophonia: A scoping review of research*," J Clin Psychol, vol. 75, no. 7, pp. 1203-1218, July 2019, and A. Schroder et al., "*Diminished n*1 *auditory evoked potentials to oddball stimuli in misophonia patients*," Front Behav Neurosci, vol. 8, p. 123, 2014.

The problem is readily solved if all environment sound is perpetually blocked; however, this prevents the individual from properly interacting with their environment. Another approach to misophonia is the use of active noise cancellation devices, which do not entirely block out but mitigate sounds by countering certain frequencies of the trigger. The results are mixed as these are primarily effective at lower frequency sounds with predictable patterns. Many trigger sounds in fact present in the higher frequency range in unorganized patterns, rendering these techniques inadequate. Active noise cancellation also suffers from the elimination of desired environmental sounds that are not triggers. Thus, no effective solutions to the problems caused by misophonia have as yet been available. It is to addressing this deficiency that the present disclosure is directed.

BRIEF DESCRIPTION OF THE DRAWINGS

Several embodiments of the present disclosure are hereby illustrated in the appended drawings. It is to be noted, however, that the appended drawings only illustrate several embodiments and are therefore not intended to be considered limiting of the scope of the present disclosure.

DETAILED DESCRIPTION

Figure 1:
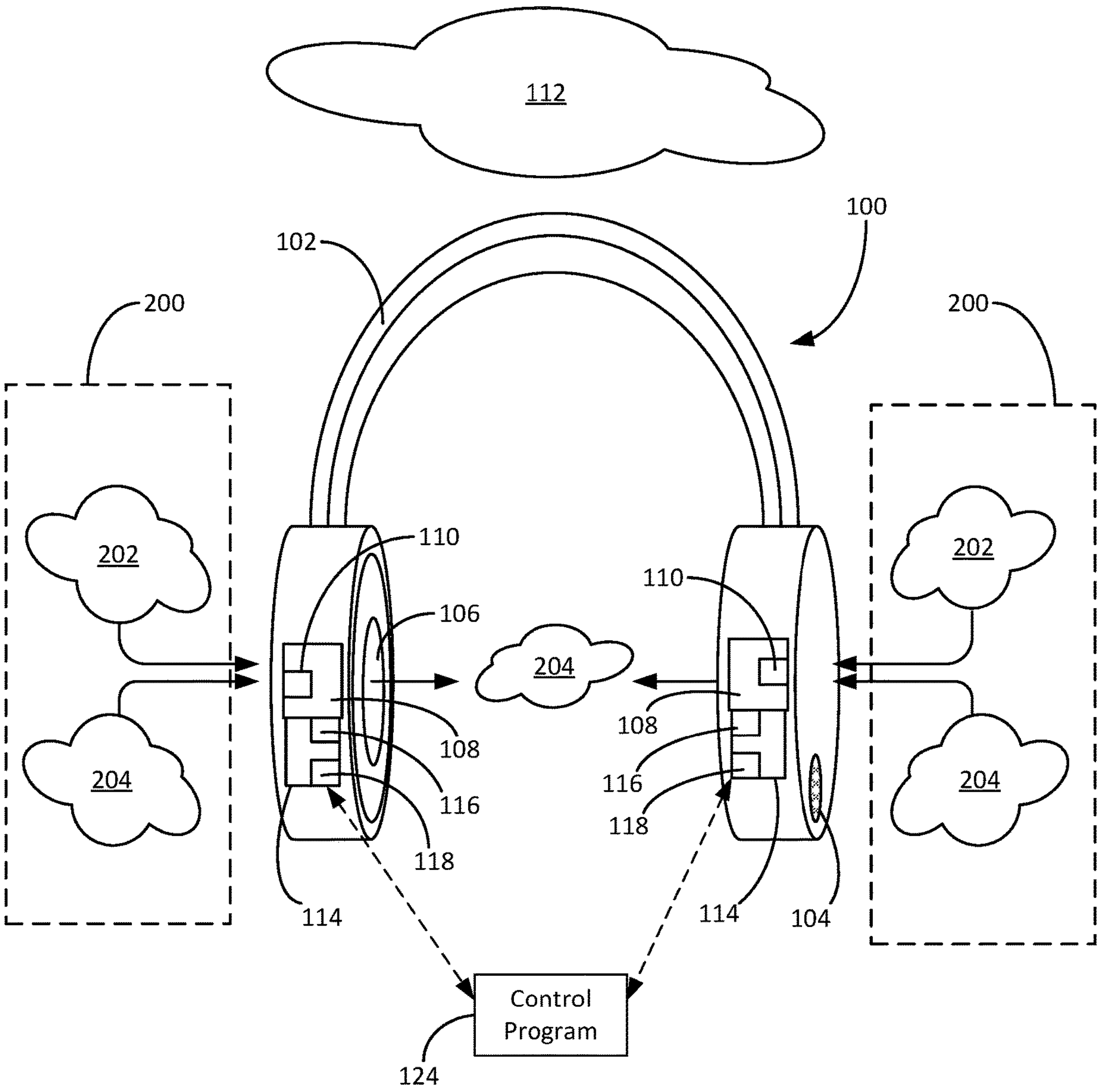
FIG. 1 shows an embodiment of a device of the present disclosure in which an Artificial Intelligence (AI) module is embedded within a headset.

There has been significant research in improving audio quality of online communication in recent years, given the ubiquity of virtual meetings. Unwanted background noise (barking, crying children, eating, etc.) can be more than a little distracting, which has led to the development of cutting-edge techniques that allow near-total elimination of noise by taking full advantage of modern computational power. Microsoft has spear-headed the approach to noise suppression by collecting hundreds of hours of voice and noise data for the purpose of training machine learning algorithms. This data is open source for developers to freely use. See H. Dubey et al., "*Icassp* 2022 *deep noise suppression challenge*," in ICASSP 2022-2022 IEEE International Conference on Acoustics, Speech and Signal Processing (ICASSP), 2022: IEEE, pp. 9271-9275. While these algorithms have been successfully used in virtual settings, there has been no application of these algorithms for treating misophonia in-person and in real-time.

The ideal device for management of misophonia would block a user from hearing all sounds that the user considered to be undesirable, while simultaneously allowing all other sounds to be heard. It is to providing such a device and method of its use that the present disclosure is directed. The apparatus of the present disclosure uses machine learning algorithms for virtual noise suppression to in-person noise suppression. In one embodiment, the device can both eliminate all sound coming to the user directly from the environment, and can replay processed environmental sound which has been filtered or "cleansed" of trigger sound(s). This is made possible by combining traditional noise blocking techniques with a deep learning processor ("DLP"). DLPs are highly specialized circuits capable of efficiently running machine learning algorithms. In the novel implementation disclosed herein, the combination of DLPs with a noise blocking headset allows for the near-total elimination of trigger sounds without compromising the user's ability to interact with the environment.

There are multiple embodiments in which the device can be configured. One non-limiting embodiment is an integrated system in which a headset includes the following features: (1) active noise cancelation; (2) external microphones that the record the environment; and (3) onboard circuitry that includes a DLP. Active noise cancelation from a quality headset removes most of the surrounding sounds, but a low level of white noise is required to block out all sound. A few milliseconds worth of the signals from the microphone are digitized and sent to the DLP. The DLP then analyzes the spectrographic pattern of the data, i.e., the time-evolution of the input frequencies, and produces filtered data with a machine learning algorithm. The inherent parameters of this algorithm have been previously learned by training the machine on a dataset from various speech and noise sources. The filtered audio is then played through the headset, such that the user only hears white noise and the filtered audio. The device could be a headset which rests against the head adjacent the outer ears, or an ear-level device that fits within the ear canal.

In another non-limiting embodiment, the device includes a headset with active noise cancelation and external microphones to receive sounds (signals) from the environment. The DLP is not housed in the headset, but in a separate processing unit. The signals are received by the external microphones and sent via wired connectors to the DLP unit which filters the signals. The filtered signals are then sent via wired connectors back to the headset, whereby the user only hears filtered audio sounds and white noise.

In another non-limiting embodiment involves a headset with active noise cancelation. The external microphones are not integrated into the headset but are attached to the outer lobes via an adhesive or mechanical holder. As in the previous iteration, the signals are then sent to a DLP unit where they are processed and filtered. The processed audio is returned to the headset where it is played to the user along with the white noise.

In another non-limiting embodiment, the device comprises a headset which has active noise canceling, and either integrated or separate external microphones. The signals received by the external microphones are then sent to a smartphone with an integrated DLP with wired connectors. An application on the smartphone filters the audio and sends the processed signals to the headset the filtered audio is delivered to the user simultaneously with the white noise.

As used herein, the term "headset" refers to any device configured to produce sounds within an audible range for reception by a user's ears, including, but not limited to, headphones, earbuds, hearing aids, or any device that partially or entirely fits within the ear canal of the user. As disclosed herein, a headset may include one or more internal, external or remotely connected microphones.

Before further describing various embodiments of the apparatus, component parts, and methods of the present disclosure in more detail by way of exemplary description, examples, and results, it is to be understood that the embodiments of the present disclosure are not limited in application to the details of apparatus, component parts, and methods as set forth in the following description. The embodiments of the apparatus, component parts, and methods of the present disclosure are capable of being practiced or carried out in various ways not explicitly described herein. As such, the language used herein is intended to be given the broadest possible scope and meaning; and the embodiments are meant to be exemplary, not exhaustive. Also, it is to be understood that the phraseology and terminology employed herein is for the purpose of description and should not be regarded as limiting unless otherwise indicated as so. Moreover, in the following detailed description, numerous specific details are set forth in order to provide a more thorough understanding of the disclosure. However, it will be apparent to a person having ordinary skill in the art that the embodiments of the present disclosure may be practiced without these specific details. In other instances, features which are well known to persons of ordinary skill in the art have not been described in detail to avoid unnecessary complication of the description. While the apparatus, component parts, and methods of the present disclosure have been described in terms of particular embodiments, it will be apparent to those of skill in the art that variations may be applied to the apparatus, component parts, and/or methods and in the steps or in the sequence of steps of the method described herein without departing from the concept, spirit, and scope of the inventive concepts as described herein. All such similar substitutes and modifications apparent to those having ordinary skill in the art are deemed to be within the spirit and scope of the inventive concepts as disclosed herein.

All patents, published patent applications, and non-patent publications referenced or mentioned in any portion of the present specification are indicative of the level of skill of those skilled in the art to which the present disclosure pertains, and are hereby expressly incorporated by reference in their entirety to the same extent as if the contents of each individual patent or publication was specifically and individually incorporated herein. In particular, the entire contents of U.S. provisional application No. 63/347,878, filed Jun. 1, 2022, is expressly incorporated herein by reference.

Unless otherwise defined herein, scientific and technical terms used in connection with the present disclosure shall have the meanings that are commonly understood by those having ordinary skill in the art. Further, unless otherwise required by context, singular terms shall include pluralities and plural terms shall include the singular.

As utilized in accordance with the methods and compositions of the present disclosure, the following terms and phrases, unless otherwise indicated, shall be understood to have the following meanings: The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or when the alternatives are mutually exclusive, although the disclosure supports a definition that refers to only alternatives and "and/or." The use of the term "at least one" will be understood to include one as well as any quantity more than one, including but not limited to, 2, 3, 4, 5, 6, 7, 8, 9, 10, 15, 20, 30, 40, 50, 100, or any integer inclusive therein. The phrase "at least one" may extend up to 100 or 1000 or more, depending on the term to which it is attached; in addition, the quantities of 100/1000 are not to be considered limiting, as higher limits may also produce satisfactory results. In addition, the use of the term "at least one of X, Y and Z" will be understood to include X alone, Y alone, and Z alone, as well as any combination of X, Y and Z.

As used in this specification and claims, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The term "or combinations thereof" as used herein refers to all permutations and combinations of the listed items preceding the term. For example, "A, B, C, or combinations thereof" is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AAB, BBC, AAABCCCC, CBBAAA, CABABB, and so forth. The skilled artisan will understand that typically there is no limit on the number of items or terms in any combination, unless otherwise apparent from the context.

Throughout this application, the terms "about" or "approximately" are used to indicate that a value includes the inherent variation of error for the apparatus, composition, or the methods or the variation that exists among the objects, or study subjects. As used herein the qualifiers "about" or "approximately" are intended to include not only the exact value, amount, degree, orientation, measuring error, manufacturing tolerances, stress exerted on various parts or components, observer error, wear and tear, and combinations thereof, for example.

The terms "about" or "approximately", where used herein when referring to a measurable value such as an amount, percentage, temporal duration, and the like, is meant to encompass, for example, variations of ±25% or ±20% or ±10%, or ±5%, or ±1%, or ±0.1% from the specified value, as such variations are appropriate to perform the disclosed methods and as understood by persons having ordinary skill in the art. As used herein, the term "substantially" means that the subsequently described event or circumstance completely occurs or that the subsequently described event or circumstance occurs to a great extent or degree. For example, the term "substantially" means that the subsequently described event or circumstance occurs at least 90% of the time, or at least 95% of the time, or at least 98% of the time.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, all numerical values or ranges include fractions of the values and integers within such ranges and fractions of the integers within such ranges unless the context clearly indicates otherwise. A range is intended to include any sub-range therein, although that sub-range may not be explicitly designated herein. Thus, to illustrate, reference to a numerical range, such as 1-10 includes 1, 2, 3, 4, 5, 6, 7, 8, 9, 10, as well as 1.1, 1.2, 1.3, 1.4, 1.5, etc., and so forth. Reference to a range of 2-125 therefore includes 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, and 125, as well as sub-ranges within the greater range, e.g., for 2-125, sub-ranges include but are not limited to 2-50, 5-50, 10-60, 5-45, 15-60, 10-40, 15-30, 2-85, 5-85, 20-75, 5-70, 10-70, 28-70, 14-56, 2-100, 5-100, 10-100, 5-90, 15-100, 10-75, 5-40, 2-105, 5-105, 100-95, 4-78, 15-65, 18-88, and 12-56. Reference to a range of 1-50 therefore includes 1, 2, 3, 4, 5, 6, 7, 8, 9, 10, 11, 12, 13, 14, 15, 16, 17, 18, 19, 20, etc., up to and including 50, as well as 1.1, 1.2, 1.3, 1.4, 1.5, etc., 2.1, 2.2, 2.3, 2.4, 2.5, etc., and so forth. Reference to a series of ranges includes ranges which combine the values of the boundaries of different ranges within the series. Thus, to illustrate reference to a series of ranges, for example, a range of 1-1,000 includes, for example, 1-10, 10-20, 20-30, 30-40, 40-50, 50-60, 60-75, 75-100, 100-150, 150-200, 200-250, 250-300, 300-400, 400-500, 500-750, 750-1,000, and includes ranges of 1-20, 10-50, 50-100, 100-500, and 500-1,000. The range 100 units to 2000 units therefore refers to and includes all values or ranges of values of the units, and fractions of the values of the units and integers within said range, including for example, but not limited to 100 units to 1000 units, 100 units to 500 units, 200 units to 1000 units, 300 units to 1500 units, 400 units to 2000 units, 500 units to 2000 units, 500 units to 1000 units, 250 units to 1750 units, 250 units to 1200 units, 750 units to 2000 units, 150 units to 1500 units, 100 units to 1250 units, and 800 units to 1200 units. Any two values within the range of about 100 units to about 2000 units therefore can be used to set the lower and upper boundaries of a range in accordance with the embodiments of the present disclosure. More particularly, a range of 10-12 units includes, for example, 10, 10.1, 10.2, 10.3, 10.4, 10.5, 10.6, 10.7, 10.8, 10.9, 11.0, 11.1, 11.2, 11.3, 11.4, 11.5, 11.6, 11.7, 11.8, 11.9, and 12.0, and all values or ranges of values of the units, and fractions of the values of the units and integers within said range, and ranges which combine the values of the boundaries of different ranges within the series, e.g., 10.1 to 11.5. Reference to an integer with more (greater) or less than includes any number greater or less than the reference number, respectively. Thus, for example, reference to less than 100 includes 99, 98, 97, etc. all the way down to the number one (1); and less than 10 includes 9, 8, 7, etc. all the way down to the number one (1).

The terms "increase," "increasing," "enhancing," or "enhancement" are defined as indicating a result that is greater in magnitude than a control number derived from analysis of a cohort, for example, the result can be a positive change of at least 5%, 10%, 20%, 30%, 40%, 50%, 80%, 100%, 200%, 300% or even more in comparison with the control number. Similarly, the terms "decrease," "decreasing," "lessening," or "reduction" are defined as indicating a result that is lesser in magnitude than a control number, for example, the result can be a negative change of at least 5%, 10%, 20%, 30%, 40%, 50%, 80%, 100%, 200%, 300% or even more in comparison with the control number.

The term "ambient sound," as used herein, refers to all of the sounds that are in the vicinity and thus hearable by the user of the present technology, i.e., the unprocessed sounds which are perceived by the user.

The term "trigger sound," as used herein, refers to a particular sound that can cause a strong undesired response in an individual, such an emotional response or behavior or physiological response which often cannot be controlled by the individual. The responses or behaviors, can be, for example, annoyance, irritation, anxiety, fear, anger, rage, disgust, panic, and "fight or flight." Physiological responses can include, for example, increased blood pressure, increased heart rate, chest pressure or tightness, goosebumps, and sweating.

Deep learning generally refers to methods that map data through multiple levels of abstraction, where higher levels represent more abstract entities. The goal of deep learning is to provide a fully automatic system for learning complex functions that map inputs to outputs, without using hand crafted features or rules. One implementation of deep learning comes in the form of feedforward neural networks, where levels of abstraction are modeled by multiple non-linear hidden layers.

"AI" refers as an acronym to "artificial intelligence." "DLP" refers as an acronym to "deep learning processor." The acronym "STFT" refers to "short-time Fourier transform."

Where reference is made herein to a method comprising two or more defined steps, the defined steps can be carried out in any order or simultaneously (except where context excludes that possibility), and the method can also include one or more other steps which are carried out before any of the defined steps, between two of the defined steps, or after all of the defined steps (except where context excludes that possibility).

The present disclosure will now be discussed in terms of several specific, non-limiting, examples and embodiments. The examples described below, which include particular embodiments, will serve to illustrate the practice of the present disclosure, it being understood that the particulars shown are by way of example and for purposes of illustrative discussion of particular embodiments and are presented in the cause of providing what is believed to be a useful and readily understood description of procedures as well as of the principles and conceptual aspects of the present disclosure.

Machine Learning is a subfield of AI in which machines learn a task without being explicitly programmed for it. In machine learning, models are created using algorithms that can learn from data and make predictions or decisions based on that data. The models are trained on historical data, and the goal is to make accurate predictions or decisions about new, unseen data. AI filtration algorithms utilizing machine learning, many of which provide code repository links in which to access them, are generally disclosed in H. Dubey et al., "*Icassp* 2022 *deep noise suppression challenge*," in ICASSP 2022-2022 IEEE International Conference on Acoustics, Speech and Signal Processing (ICASSP), 2022: IEEE, pp. 9271-9275, L. Chen et al., "*Multi-Stage and Multi-Loss Training for Fullband Non-Personalized and Personalized Speech Enhancement*," in ICASSP 2022-2022 IEEE International Conference on Acoustics, Speech and Signal Processing (ICASSP), 23-27 May 2022, pp. 9296-9300, S. Zhao, B. Ma, K. N. Watcharasupat, and W. S. Gan, "*FRCRN: Boosting Feature Representation Using Frequency Recurrence for Monaural Speech Enhancement*," in ICASSP 2022-2022 IEEE International Conference on Acoustics, Speech and Signal Processing (ICASSP), 23-27 May 2022, pp. 9281-9285, G. Yu, Y. Guan, W. Meng, C. Zheng, and H. Wang, "*DMF Net: A decoupling-style multi-band fusion model for real-time full-band speech enhancement*," arXiv preprint arXiv: 2203.00472, 2022, X. Hao, X. Su, R. Horaud, and X. Li, "*FullSubNet: a full-band and sub-band fusion model for real-time single-channel speech enhancement*," in ICASSP 2021-2021 IEEE International Conference on Acoustics, Speech and Signal Processing (ICASSP), 2021: IEEE, pp. 6633-6637, and G. Zhang, L. Yu, C. Wang, and J. Wei, "*Multi-Scale Temporal Frequency Convolutional Network With Axial Attention for Speech Enhancement*," in ICASSP 2022-2022 IEEE International Conference on Acoustics, Speech and Signal Processing (ICASSP), 23-27 May 2022 2022, pp. 9122-9126, the disclosures of which are herein incorporated by reference.

A typical machine learning algorithm is comprised of a neural network which consists of multiple "hidden layers" containing programmable variables. The input to the neural network is modified via these hidden layers and transformed into a filtered output. Machine learning algorithms have two modes of operation: "training" and "inference." In the training mode, the variables within the hidden layers are set based upon pre-acquired training data. The inference mode is the deployed form of algorithm whereby an input is fed into the neural network and produces a desired filtered output; the variables within the hidden layers remain static in this mode.

During training, the algorithm is fed a noisy input which is a mixture of predetermined neutral data and undesired "noise" (trigger) data in an uncompressed format (such as Wave Audio File Format). For example, the input for one iteration could be voice of a human (neutral sounds) mixed with the barking of a dog (trigger sounds). The corresponding desired output which would be the human voice and completely suppressed barking (trigger) sounds. Both the input and desired output are fed into the algorithm and the variables within the hidden layers are adjusted such that the input is more appropriately mapped to the desired output. This process is repeated for each audio chunk. The length of an audio chunk is constant and can be arbitrarily set, though it typically lasts at least a few seconds.

In inference mode, a stream of audio data is supplied to the neural network, which outputs a stream of filtered data. The stream is comprised of consecutive chunks of audio data of a certain length that can be arbitrarily set, though typically 512 samples. The samples are transformed into the frequency domain utilizing a short-time-Fourier transform (STFT), before being fed into the neural network, with outputs a signal that is then transformed back into the time domain using an inverse STFT. The process, such as those described in the references cited herein, is repeated for each chunk.

The above process works well for virtual-communications, though additional steps must be taken for customizable real-time in-person audio filtration. The trained algorithm is downloaded onto the target device and care must be taken to ensure the algorithm is compatible with appropriate hardware. During the training process, variables such as sampling frequency and stream chunk size must be consistent with the hardware capabilities. It is crucial that the algorithm must also be in a language that the underlying software can understand. Many structures within the neural networks described in the references cited herein are not compatible with certain manufacturers' devices and must be appropriately converted or transcribed as needed. The device must comprise machine-learning accelerated hardware, and the converted algorithm must utilize this hardware appropriately to ensure real-time performance.

The machine learning algorithm, in order to be trained, must be fed a large volume of sound data from a variety of noise sources. This data can either be collected by manually recording or received from open-source repositories. The sound data must then be segmented and classified by type, making it easy for a future user to selectively choose which sounds are desired and which are not. An undesired noise type could be dog-barking, for example, in which there would ideally be hours of data within the dataset representing such. If the user desires to eliminate only barking dog sounds, the segments of audio associated with dog-barking within the data set will be assigned as undesired noise, while all other segments will be assigned as clean audio. Sounds classified as undesired noise and clean audio will be fed into the machine learning training algorithm. The algorithm will be trained to filter out all audio that is similar to the dog-barking audio, while allowing clean audio to pass.

Examples of undesired trigger sounds include, but are not limited to: eating sounds, slurping, gulping, sipping, chewing, gum-popping, crunching, swallowing, licking, lip-smacking, mouth noises, loud breathing, tongue-clicking, nail-biting, nail-clipping, nail filing, nails-on-chalkboard, finger-tapping, pen-clicking, joint-cracking, scratching, sniffling, sirens, gun shots, snoring, yawning, throat-clearing, coughing, hiccups, whistling, kissing, keyboard typing, pen-clicking, rustling bags, paper, or plastic, turning pages, water dripping, clocks ticking, mechanical humming, shoes shuffling, tableware or silverware clinking, chimes, birds or crickets chirping, whistling, repeating sounds, baby crying, toilet flushing, page flipping, lawnmowers, dog and cat grooming, rooster crowing, dog whimpering, cat purring, cat meowing, and dog barking.

Different algorithms can be generated depending on the user's preference. Different permutations of the classified noise types can be fed, such that combinations of classifications of sound can be filtered out. The developer will generate a large number of filtration algorithms by generating many permutations of combinations of sound classifications, such that the user will either be able to select or download on the device their desired filtration pattern. The interface in which to select or download an alternate permutation of filtration can be controlled by a mobile app that controls the device.

In a typical embodiment of the apparatus of the present disclosure, an automated audio exclusion device 100 comprises at least two speakers and at least two microphones. The device can take any form of a headset. The microphone records the ambient sound environment, sends data to an audio processor, which is either in a separate mobile device, a separate processing pack, or onboard the headset, where it is processed using the machine learning algorithm. The output is sent to the internal speakers in the device where it may be mixed with artificial sounds, such as white noise.

It must be ensured that the algorithm is capable of running with minimal latency such that the user will perceive negligible delay between visual and auditory stimuli. This requirement warrants a wired connection between the microphones, processor, and speakers to ensure minimal latency. Unlike virtual communications, a stereo connection is required in order to simulate the directionality of in-person communication. The input to each microphone must be processed independently before being sent to their corresponding speakers.

Turning now to FIG. 1, shown therein is a non-limiting embodiments of the automated audio exclusion device 100. In this embodiment, the automated audio exclusion device 100 is an integrated system in which all components are self-contained within a headset 102. The headset 102 includes one or more microphones 104, one or more speakers 106, and an onboard sound processor module 108 that has been programmed with noise cancellation technology 110.

The microphones 104 are configured to record ambient sounds 200 from the environment 112 surrounding the user. The microphones 104 can be configured to record sounds other than those originating from the user, such as vocalizations of the user. The microphones 104 can be integrated into the headset 102, attached to the outside of the headset 102, or positioned remotely from the headset 102 and connected to the headset 102 with a wired or wireless connection. In exemplary embodiments, the microphones 104 are distributed on the headset 102 to capture the ambient sounds 200 in stereo or other multichannel formats.

The recorded ambient sounds 200 may include both predetermined undesired "trigger" sounds 202 and neutral "non-trigger" sounds 204. The recorded ambient sounds 200 can be processed with the sound processor module 108, converted into digital signals, and sent to an AI module 114 for processing. The AI module 114 includes a DLP 116 that is configured to process the digitized signals for both the trigger sounds 202 and the non-trigger sounds 204. The AI module 114 includes a library 118 that includes a plurality of preestablished signal signatures 206 that correspond to known trigger sounds 202. The DLP 116 processes the inbound signals for the ambient sounds 200 and compares the processed signal data against the signal signatures 206 to identify if the ambient sounds 200 include undesired trigger sounds 202. In some embodiments, the signature library 118 is uploaded and updated by connecting the automated audio exclusion device 100 to a remote computer (not shown) through a wired or wireless connection.

Once the AI module 114 determines that the ambient sounds 200 include trigger sounds 202, the predetermined undesired trigger sounds 202 are separated from the desired non-trigger sounds 204 and discarded, while the desired sounds 204 are passed along to the user through the speakers 106. The headset 102 can take the shape of headphones housed outside the ear (as depicted in FIG. 1), or an ear-level device that fits partially or completely within the ear canal. In the embodiment depicted in FIG. 1, the AI module 114 and DLP 116 are incorporated into the headset 102. It will be appreciated that the sound processor module 108, the AI module 114, the DLP 116 and the signature library 118 can be presented as separate hardware modules or as functional units that operate on common hardware components.

Figure 2:
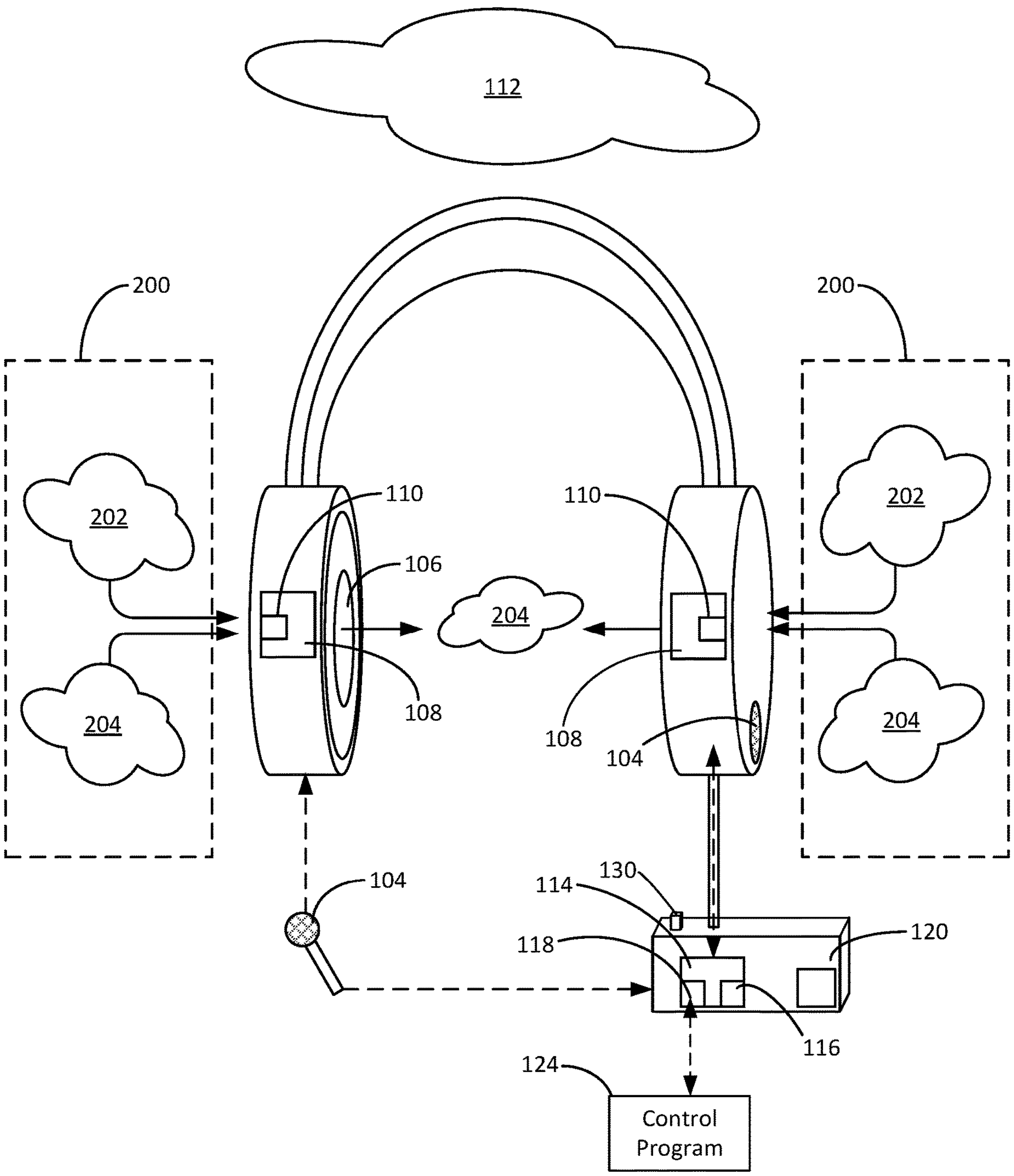
FIG. 2 shows an embodiment of a device of the present disclosure in which the AI module is separate from the headset.

Turning to FIG. 2, shown therein is an embodiment in which the AI module 114 is not integrated into the headset 102, but is instead contained in a separate AI module housing 120. The AI module 114 can be in a separate computing box which is spaced apart from the headset 102 and connected to the headset 102 with a cable or wire. The AI module housing 120 can be provided with a separate power source and may include a display and user interface. In the embodiment depicted in FIG. 2, the automated audio exclusion device 100 includes an external microphone 104 for recording signals that is connected to the AI module housing 120 or headset 102 with a wired or wireless connection. The external microphone 104 can be used in combination with integrated microphones 104 on the headset 102. The input signals detected by the microphones 104 are sent to the AI module 114 where they are filtered and returned to the speakers 106 of the headset 102, separating the undesired sounds 202 from the neutral sounds 204.

Figure 3:
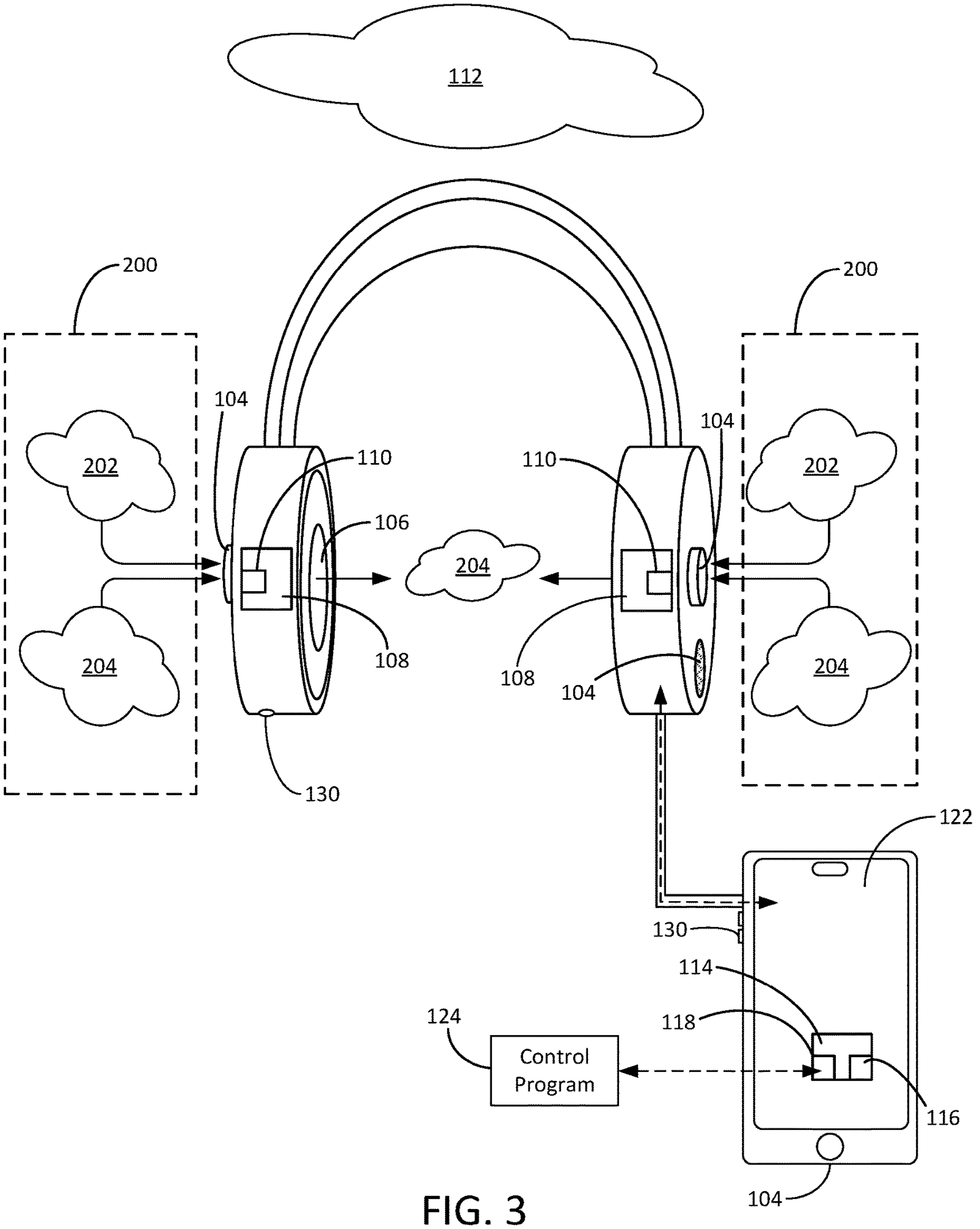
FIG. 3 illustrates an embodiment of a device of the present disclosure in which the AI module is embedded in a smartphone.

Turning to FIG. 3, shown therein is another embodiment in which the AI module 114 is integrated into a mobile computing device 122, such as a smartphone, smartwatch, tablet, laptop, or similar such portable digital electronic device. In this embodiment, the headset 102 includes externally-affixed microphones 104. The externally-affixed microphones 104 can be used in combination with integrated microphones 104 on the headset 102. The data recorded from the microphones 104 is sent to the mobile device 122 where it is processed using the DLP 116 within the AI module 114 of the mobile computing device 122. Undesired sounds 202 are separated from neutral sounds 204, which are returned to the headset 102 as signals and replayed to the user through the speakers 106.

In each of these embodiments, the properties of the filtration of the sounds and the performance of the AI module 114 can be adjusted via wireless or wired connection to a control program 124, which may take the form of a mobile application configured to run on the mobile computing device 122. For example, the control program 124 can be configured to periodically update the parameters of the filtration algorithm, change the signature library 118, and modify the type and loudness of noise (white noise, for example) played alongside the filtered audio.

Figure 4:
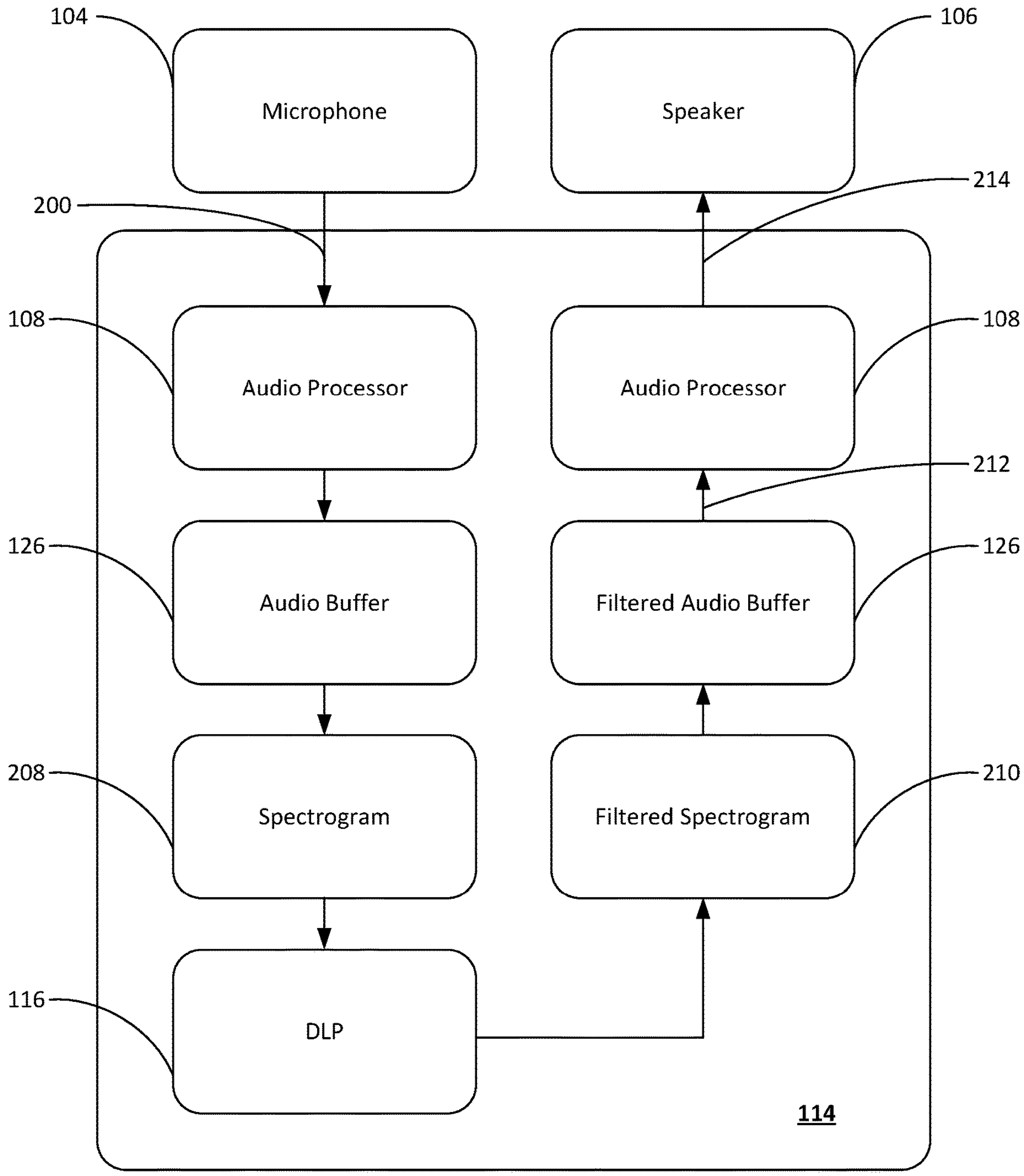
FIG. 4 shows a flowchart of the flow of data within the AI module.

FIG. 4 shows an exemplary scheme of the configuration of the AI module 114 in each of the embodiments described above. Each microphone 104 records the external ambient sounds 200 and sends the analog signals to an audio processor 108 where it is digitized. The audio processor 108 can be a sound card. A sufficient duration of audio data (e.g., about 1, 5, 10, 15, 20, 25, 30, 35, 40, 45 or 50 milliseconds, or fractions thereof) can be stored within an audio buffer 126 after which it undergoes a short time Fourier transform (STFT) to produce input spectrographic data 208 for analysis by the deep learning processor (DLP) 116.

The problem of eliminating trigger sounds 202 cannot be rectified by simply using a processor to eliminate entirely frequencies associated with the undesirable trigger sounds 202 while keeping the frequencies associated with the desired neutral sounds 204 because frequencies between the desired sounds 204 and the undesired sounds 202 often have significant overlap. Thus, eliminating all frequencies that are found in the undesired sounds 202 will result in significant distortion and elimination of voice data and other desired sounds 204. However, processing and analyzing the time-evolution of the frequencies of the spectrographic data, as opposed to a signal snapshot of the frequencies, permits the separation by the AI module 114 of the desired sound 204 data from the undesired sound 202 data. The DLP 116 receives the input spectrographic data 208 as input and runs a machine learning algorithm to infer or produce filtered spectrographic data 210 by comparing or analyzing features of the input spectrographic data against the signal signatures 206 in the signature library 118, which was previously created and trained with desired sounds 204 and undesired sounds 202. Based on matches between the input spectrographic data 208 and the signal signatures 206 within the signature library 118, the AI module 114 can produce filtered spectrographic data 210 that retains the desired sounds 204 and eliminates the undesired trigger sounds 202.

The filtered spectrographic data 210 then undergoes an inverse STFT to obtain a filtered digital signal 212. The filtered digital signal 212 can then be converted by the sound processor module 108 into filtered audio signal 214. The filtered audio signal 214 is then output (delivered) to the speakers 106 of the headset 102. This process repeatedly runs for each chunk of a few milliseconds of data and occurs for each channel in parallel.

In some embodiments, the output from previous inferences made by the AI module 114 can also serve as an input to the algorithms within the AI module 114. Different individuals have different trigger sounds 202, so the machine learning algorithm can be adjusted according to each individual tastes, allowing for the elimination of trigger sounds that are uniquely undesirable to them. For example, if the user is presented with an undesirable trigger sound 202 that was not initially filtered by the AI module 114 because the input spectrographic data 208 did not sufficiently match a trigger sound 202 signal in the signature library 118, the user can indicate that presence of the trigger sound 202 by pressing a button 130 on the headset 102, AI module housing 120 or mobile computing device 122. Over time and iterations of exposure, the AI module 114 can discern and detect the user-specific trigger sound 202 and update the signature library 118 accordingly.

Figure 5:
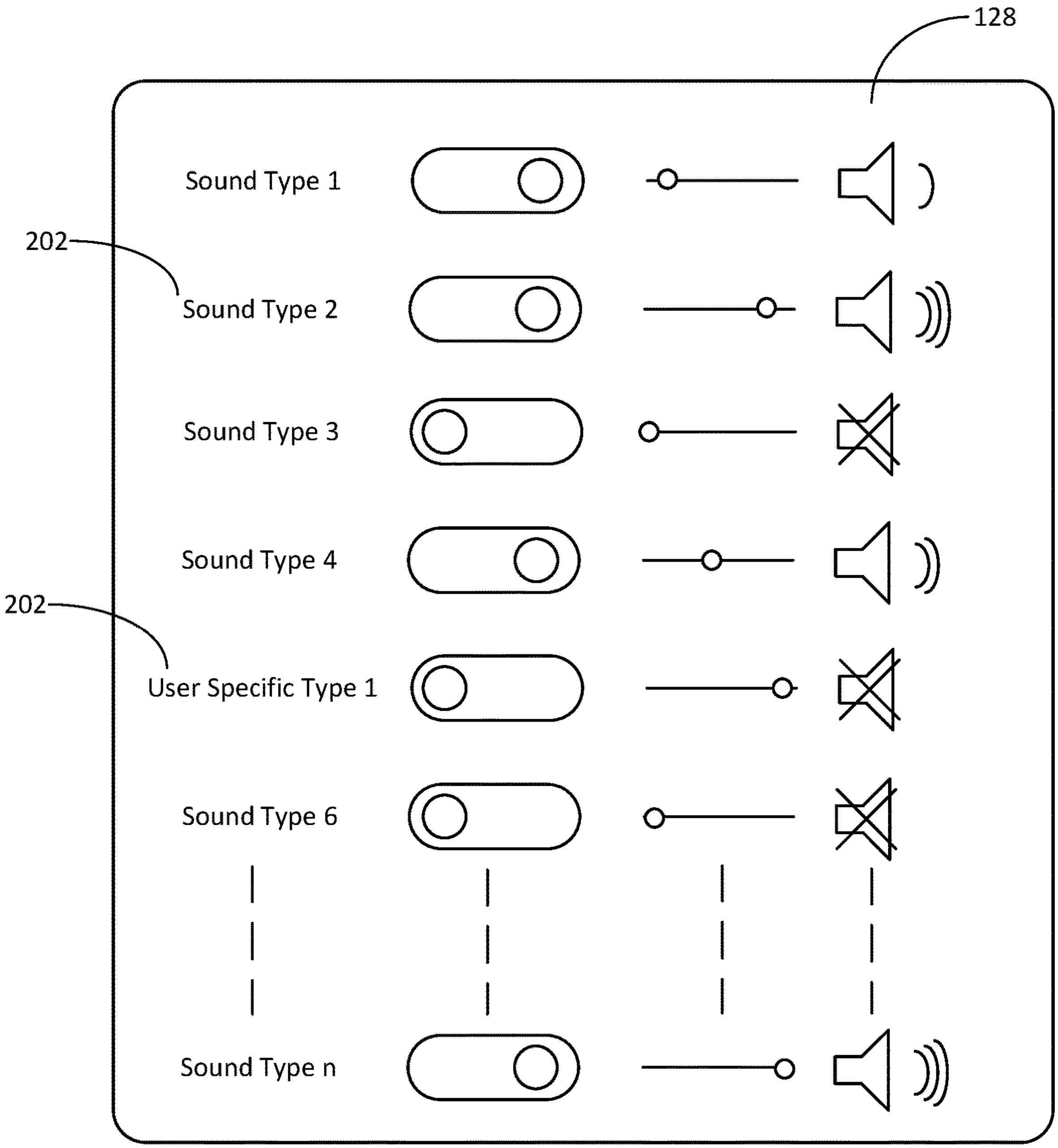
FIG. 5 shows an element of the user interface run by a smartphone application.

FIG. 5 represents a graphical user interface 128 for the application control program 124, which can be used to adjust the operation of the automated audio exclusion device 100 according to particular trigger sounds 202 ("sound types") that are filtered from the ambient sounds 200. The user is presented with a number of preset sound types (preset trigger sounds 202) and is able to selectively choose which particular sound types 202 are subjected to filtration, and the desired volumes of each of those sound types 202. For example, it may not be necessary to completely remove each trigger sound 202 from the audio provided to the user after filtration. The user interface 128 for the application control program 124 can also be configured to adjust the extent to which user-specific trigger sounds 202 are filtered by the automated audio exclusion device 100.

While the apparatus and methods of this disclosure have been described in terms of particular embodiments, it will be apparent to those of skill in the art that variations may be applied to the methods and in the steps or in the sequence of steps of the method described herein without departing from the concept, spirit and scope of the disclosure. All such similar variations and modifications apparent to those skilled in the art are deemed to be within the spirit, scope and concept of the inventive concepts as defined by the appended claims.

What is claimed is:

1. A method for removing unwanted trigger sounds from ambient sounds while allowing non-trigger sounds to be heard by a user, the method comprising the steps of:
- providing an automated audio exclusion device that includes a headset, one or more microphones and one or more speakers;
- recording the ambient sounds with the one or more microphones;
- digitizing the recorded ambient sounds into digital signals;
- creating spectrographic data for the digital signals;
- comparing the spectrographic data against a signature library that comprises preprogrammed spectrographic data for the unwanted trigger sounds;
- identifying the spectrographic data that corresponds to the unwanted trigger sounds;
- removing the unwanted trigger sounds from the spectrographic data to provide filtered spectrographic data;
- converting the filtered spectrographic data into a filtered digital signal;
- converting the filtered digital signal into a filtered audio signal that does not include the unwanted trigger sounds; and
- playing the filtered audio signal to the user through the one or more speakers on the headset.

2. The method of claim 1, wherein the step of recording the ambient sounds with the one or more microphones further comprises recording the ambient sounds with one or more microphones integrated into the headset.

3. The method of claim 1, wherein the step of recording the ambient sounds with the one or more microphones further comprises recording the ambient sounds with one or more microphones not integrated into the headset.

4. The method of claim 1, wherein the step of digitizing the recorded ambient sounds into digital signals further comprises digitizing the ambient sounds in samples having a defined length.

5. The method of claim 1, wherein the step of comparing the spectrographic data against the signature library comprises using an AI module.

6. The method of claim 5, wherein the step of comparing the spectrographic data against the signature library comprises using a deep learning processor (DLP) within the AI module.

7. The method of claim 5, further comprising the step of training the AI module on trigger sounds to produce the signature library before the step of comparing the spectrographic data against a signature library that comprises preprogrammed spectrographic data for the unwanted trigger sounds.

8. The method of claim 5, wherein the step of creating spectrographic data for the digital signals comprises transforming the digital signals into the frequency domain utilizing a short-time-Fourier transform (STFT).

9. The method of claim 8, wherein the step of converting the filtered spectrographic data into a filtered digital signal further comprises transforming the frequency domain filtered spectrographic data back into the time domain using an inverse short-time-Fourier transform (STFT).

10. A method of treatment for the auditory condition misophonia by removing unwanted trigger sounds from ambient sounds while allowing non-trigger sounds to be heard by a user, the method comprising the steps of:

providing an automated audio exclusion device that comprises:

a headset;

one or more microphones;

one or more speakers; and an AI module that includes a signature library, wherein the signature library includes preprogrammed spectrographic data for the unwanted trigger sounds;

recording the ambient sounds with the one or more microphones;

digitizing the recorded ambient sounds into digital signals;

transforming the digital signals into the frequency domain utilizing a short-time-Fourier transform (STFT) to produce spectrographic data for the ambient sounds;

comparing the spectrographic data against the signature library;

identifying the spectrographic data that corresponds to the unwanted trigger sounds;

removing the unwanted trigger sounds from the spectrographic data to provide filtered spectrographic data;

transforming the frequency domain filtered spectrographic data back into the time domain using an inverse short-time-Fourier transform (STFT) to produce filtered digital signals; and converting the filtered digital signal into a filtered audio signal that does not include the unwanted trigger sounds.

11. The method of claim 10, further comprising the step of playing the filtered audio signal to the user through the one or more speakers on the headset.

12. The method of claim 10, further comprising the step of updating the signature library based on input from the user.

* * * * *